W. F. WEST.
Seed-Sowers.

No. 146,793.   Patented Jan. 27, 1874.

Witnesses
Charles L. Barritt
R. Rowley

Inventor
William F. West

UNITED STATES PATENT OFFICE.

WILLIAM F. WEST, OF HAVERSTRAW, NEW YORK.

IMPROVEMENT IN SEED-SOWERS.

Specification forming part of Letters Patent No. 146,793, dated January 27, 1874; application filed February 15, 1873.

*To all whom it may concern:*

Be it known that I, WILLIAM F. WEST, of Haverstraw, Rockland county, State of New York, have invented certain new and useful Improvements in Machinery for Simultaneously Sowing Seed and Fertilizers; and I do hereby declare the following to be a full description of the same.

The nature of my invention consists, first, in the method of operating the seed-valve by means of a scalloped-face toothed wheel or cam-wheel on the main axle of the machine, and an adjustable link-coupling, hinged to the back end of the valve, whereby a positive and direct force is applied to operate the valve in both directions, and at the same time may be instantly disconnected from the cam-wheel by the simple operation of lifting the outer end of the link from it; second, in the method of making the seed-box or hopper adjustable upon its supporting cross-bar by means of suitable clamps and binding-screws, whereby two or more seed-boxes, as auxiliaries for sowing larger or smaller varieties of seed, may be supplied with the machine, to be brought into use in succession to sow the varieties of seeds ordinarily planted by truck-gardeners, and thus save the necessity of using a number of machines to accomplish the same results, or a complex adjustment of valves to make them universal seed-sowers; third, in the method of operating the fluke and roller for covering the seed in the furrow by means of their suspension at their back ends to a cross-bar, and a cord attached to the roller-end of the furrow-coverer, whereby, by lifting the roller-levers by the cord, a pin uniting them together acting against the lower side of the fluke-lever, lifts it also from the ground, and thus intermits the entire operation of furrowing.

But to describe my invention more particularly I will refer to the accompanying drawings forming a part of this specification, the same letters of reference wherever they occur referring to like parts.

Figure 1:
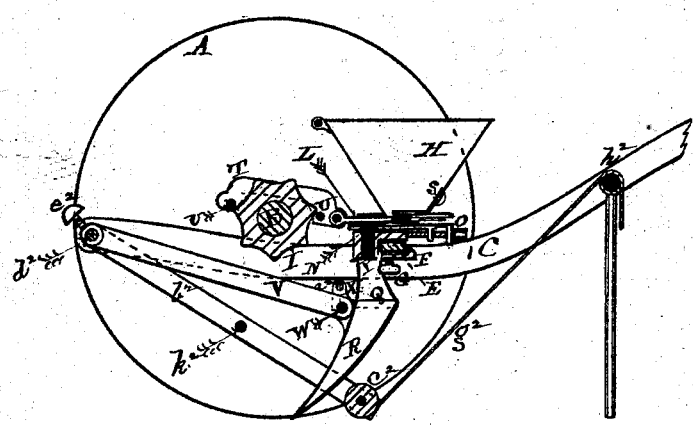
Figure 2:
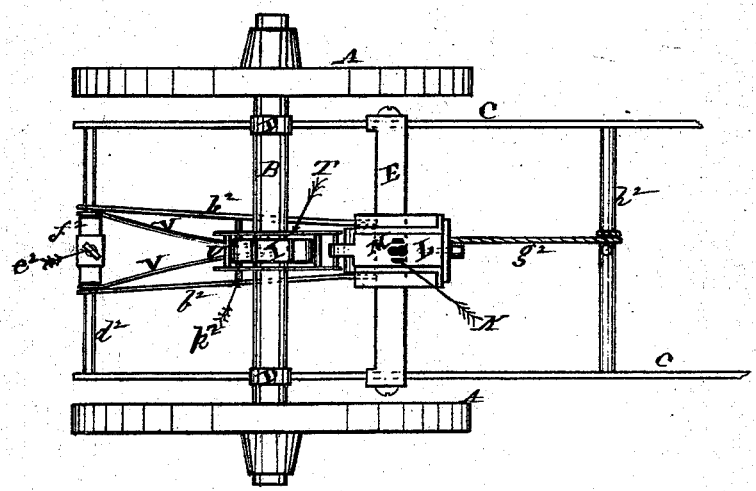
Figure 3:
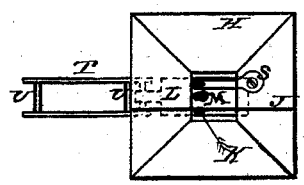

Figure 1 is a longitudinal cut section of the machine through the line *x x*, Fig. 2. Fig. 2 is a plan view of the same having the hopper removed. Fig. 3 is a plan view of the hopper, showing it subdivided into seed and fertilizer compartments, and valve and link coupling in combination therewith.

Letters A are the two track-wheels, and B the axle on which they are adjusted, and C the frame upon which the working parts of the machine is attached, suspended by collars D, arranged on the axle so as to permit it to rotate without rotating the collars. Across the frame, just back of the axle, is secured a cross-bar, E, by screw-bolts or other suitable means. Upon this cross-bar is arranged by means of a clamp, F, and binding-screws G, the hopper or seed-box H. The object of this arrangement of the seed-box is to make it adjustable—that is, that it may be shifted from side to side of the frame, to be thrown out of use, so that a second hopper similarly clamped on the cross-bar may be adjusted in place of it, opposite the scalloped-shaped tooth-wheel I, to be operated thereby to drop the seed and fertilizer. To enable the machine to do this the hopper or seed-box H is divided by a partition, J, so as to cut off one of the holes, K, in the valve L, leaving in the other compartment one or more holes, M, for the seed to escape thereby, or more properly to be taken thereby, to the vent N in the adjustable cut-off plate O underneath the valve, and thence drop the seed and fertilizer through the one opening P in the clamp or base of the seed-box, into the upper end of the flexible hose Q leading to the interior of the fluke R, to be deposited simultaneously and in contact with each other in the furrow. In the seeding compartment of the hopper two seed-vents are shown in the valve. But one of these vents is intended to be used at a time, according to the size of seed to be sown. When thus used, the other is shut off by a leather washer, S, secured to the sides of the hopper, and having its end overlap the vent to be shut off, as shown in Fig. 3.

To operate the valve, it is hinged to a link, T, having two cross-pins, U, at opposite ends, and connecting the two sides of the link together. These pins are acted upon by the teeth of the scalloped cam-wheel I on the axle B, so as to alternately draw out and force back the valve by a steady and positive motion to cause it to act certainly and smoothly at all times to drop the seed and fertilizer.

The object of making the link-connection with the valve in the manner set forth, is for two other purposes equally useful and important; first, to serve the purpose of a coupling of the seeding apparatus with the axle or prime motor of the machine; and, second, to facilitate the easy, simple, cheap, and instantaneous uncoupling of the seeding apparatus from the axle by throwing the link back on its joint with the end of the valve against the hopper.

Letter V represents the lever or arms to which the fluke R is attached by a center pin, W, through an ear-piece, X, forming a projection at the upper front side of the fluke and extending above the end of the lever V with a safety-pin, $a^2$, in it. The object of this mode of securing the lever and fluke together is to prevent the fluke breaking, should it come in contact with an obstruction. This is accomplished by making the safety-pin of wood of only sufficient strength to resist the strain of soft yielding earth, but not strong enough to resist a strain that would break off the point of the fluke, and therefore would break and let the fluke bend back in consequence of its suspension on the center-pin W, and the elasticity of the flexible hose. Letter $b^2$ represents the arms or levers of a furrow-covering roller, $c^2$, secured in its back end directly behind the fluke, while their front ends are secured to the same cross bar or rod $d^2$ as the arms of the fluke. Between the ends of the fluke and roller-levers V and $b^2$ on the rod $d^2$ is secured, by a binding-screw, $e^2$, an adjustable collar, $f^2$. The object of this method of securing the fluke and roller-levers to the rod $d^2$ in this way is to admit of their being moved from side to side to admit of the duplication of the fluke, if deemed necessary, without a change of construction in the machine, because the single link-coupling, by lengthening the joint-pin by which it is attached to the valve extending across the frame of the machine, could be made to operate any number of valves that could be arranged within the frame. For the purpose of lifting the fluke out of the furrow when not required for use, a cord, $g^2$, is attached to the roller end of the levers $b^2$, and thence carried up and around a cross-bar, $h^2$, within the easy reach of the person using the machine, which, by drawing up, lifts the roller-levers, and thus brings the cross-pin $k^2$ through their sides up under the fluke-lever V, and thus lifts both fluke and roller from off the ground.

Having now described my invention, I will proceed to set forth what I claim and desire to secure by Letters Patent of the United States.

1. The combination of the self-adjustable link-coupling T with the valve L and scalloped-faced tooth or cam wheel I, made and operating substantially in the manner hereinbefore set forth.

2. The combination of the hopper H, the cross-bar E, with the clamp F and binding-screw G, for the purpose of making said hopper or seed box adjustable from side to side on the said cross-bar, substantially as hereinbefore described.

3. The adjustable fluke-lever V and furrow roller-lever $b^2$, as arranged to work one under the other, and jointed or hinged to the cross-bar $d^2$, in combination with the lifting-pin $k^2$ in the levers $b^2$, roller $c^2$, and pulley-cord, $g^2$, all arranged as set forth, and for the purposes described.

WILLIAM F. WEST.

Witnesses:
JOHN H. LAW,
W. W. OLDFIELD.